United States Patent
Hua et al.

(10) Patent No.: US 10,683,612 B2
(45) Date of Patent: Jun. 16, 2020

(54) METHOD FOR PRODUCING CELLULOSE FILAMENTS WITH LESS REFINING ENERGY

(71) Applicant: FPInnovations, Pointe-Claire (CA)

(72) Inventors: Xujun Hua, Kirkland (CA); Guy Roger Njamen Tchapda, Montreal (CA); Tom Owston, Les Cèdres (CA); Patrick Neault, Les Coteaux (CA); Thomas Hu, Vancouver (CA); Yuxia Ben, Kirkland (CA)

(*) Notice: Subject to any disclaimer, the term of this patent is extended or adjusted under 35 U.S.C. 154(b) by 56 days.

(21) Appl. No.: 15/703,048

(22) Filed: Sep. 13, 2017

(65) Prior Publication Data
US 2018/0073194 A1 Mar. 15, 2018

Related U.S. Application Data

(60) Provisional application No. 62/394,433, filed on Sep. 14, 2016.

(51) Int. Cl.
  *D21C 9/08* (2006.01)
  *D21H 11/02* (2006.01)
  (Continued)

(52) U.S. Cl.
  CPC .............. *D21C 9/08* (2013.01); *D21C 9/002* (2013.01); *D21H 11/02* (2013.01); *D21H 11/18* (2013.01)

(58) Field of Classification Search
  None
  See application file for complete search history.

(56) References Cited

U.S. PATENT DOCUMENTS

7,381,294 B2  6/2008  Suzuki et al.
8,906,198 B2  12/2014  Sabourin et al.
(Continued)

FOREIGN PATENT DOCUMENTS

CA  2658212  9/2009
CA  2799123  11/2011
(Continued)

OTHER PUBLICATIONS

Sjoberg, J.C. and Hoglund, H. Proceedings to International Mechanical Pulping Conference, Minneapolis, MN, May 2007.
(Continued)

*Primary Examiner* — Jacob T Minskey
(74) *Attorney, Agent, or Firm* — Norton Rose Fulbright

(57) ABSTRACT

A novel method is disclosed to make cellulose filaments (CF) from wood or other plant fibers with lower energy consumption. The method consists of multi-stage, high consistency refining, followed by low consistency refining or by low consistency, non-refining mechanical treatment, of wood or other plant fibers. The total specific refining energy for the multi-stage, high consistency refining is preferably 2,000-18,000 kWh/t, and more preferably 2,000-12,000 kWh/t. The CF produced can be used as a superior reinforcement additive in the production of paper, tissue or paperboard and in the production of plastic composites. It can also be used as a viscosity or rheology modifier in food products, coatings or drilling muds. The CF produced can also be used to make strong films for application in packaging and in composites.

13 Claims, 4 Drawing Sheets

(51) Int. Cl.
*D21H 11/18* (2006.01)
*D21C 9/00* (2006.01)

(56) References Cited

U.S. PATENT DOCUMENTS

| | | | |
|---|---|---|---|
| 9,051,684 B2 | 6/2015 | Hua et al. | |
| 2011/0303372 A1* | 12/2011 | Beatson | D21B 1/16 |
| | | | 162/24 |
| 2013/0017394 A1* | 1/2013 | Hua | D21D 1/20 |
| | | | 241/28 |
| 2014/0124150 A1* | 5/2014 | Sabourin | D21C 9/001 |
| | | | 162/9 |
| 2016/0319482 A1* | 11/2016 | Ben | D21C 9/18 |

FOREIGN PATENT DOCUMENTS

| | | |
|---|---|---|
| CA | 2817635 | 5/2012 |
| CA | 2824191 | 7/2012 |
| CA | 2889991 | 5/2014 |
| WO | WO2010131016 | 11/2010 |
| WO | WO2012097446 | 7/2012 |
| WO | WO2014070452 | 5/2014 |
| WO | WO2014106684 | 7/2014 |

OTHER PUBLICATIONS

Siro, I and Plackett, D. Cellulose 17: 459-494, 2010.
PCT International Search Report dated Dec. 18, 2017 from corresponding PCT/CA2017/051073.
John R. Lavigne, Pulp & Paper Dictionary, Miller Freeman Books, 1986, pp. 84 and 175.

* cited by examiner

METHOD FOR PRODUCING CELLULOSE FILAMENTS WITH LESS REFINING ENERGY

FIELD

The present description relates to cellulose filaments production with less refining energy and the use of such cellulose filaments.

BACKGROUND ART

Cellulose filaments (CF) previously referred to as cellulose nanofilaments (CNF) are known to have many interesting properties one of which is increasing the dry and wet strength properties of paper when used as an additive in the production thereof. They are produced by multi-pass, high consistency refining of wood or other plant fibers at a high level of specific energy using high consistency refiners (Hua, X., et al. High Aspect Ratio Cellulose Nanofilaments and Method for their Production. U.S. Pat. No. 9,051,684 B2, 2015; PCT/CA2012/000060; WO 2012/097446 A1, 2012). They have superior reinforcement ability over other cellulose micro- or nano-materials such as microfibrillated cellulose (MFC) or nanofibrillated cellulose (NFC) prepared using other methods for the mechanical fibrillation of wood pulp fibers. This is because of the longer lengths and higher aspect ratio of CF as a result of the unique multi-pass and high consistency production process which minimizes fiber cutting. Consistency is the weight percentage of a cellulose material in a mixture of the cellulose material and water. High consistency (HC) in fiber processing refers to a consistency typically in the range of 20-65%. High consistency refiners are refiners with a discharge consistency of over 20%.

Production of CF that has superior reinforcement ability typically involves 2-14 passes of the wood or other plant fiber material through a high consistency refiner. The total specific refining energy applied is in the range of 2,000-20,000 kWh/t. One drawback for the production of CF that has superior reinforcement ability is the high energy consumption.

Single-pass, high consistency (35%) refining, followed by single-pass, low consistency (LC) (2%) refining of bleached softwood kraft pulp fibres has been evaluated for the reinforcement of a thermomechanical pulp (TMP)-based furnish (Sjoberg, J. C. and Hoglund, H. Proceedings to International Mechanical Pulping Conference, Minneapolis, Minn., May 2007). Only small (3-12%) improvement in tensile energy absorption (TEA) of the paper made from such HC and then LC refined kraft pulp and the TMP pulp over the paper made from the reference LC refined kraft pulp and the TMP pulp was achieved, even though the total energy applied for the HC and then LC refining (332-398 kWh/t) was significantly higher than that for the reference LC refining (84-89 kWh/t).

A method for the production of microfibrillated cellulose (MFC) fibers using multi-pass low consistency (1-6%) refining of cellulose fibers has been described (Suzuki, M. and Hattori, Y. PCT WO2004/009902; U.S. Pat. No. 7,381,294 B2, 2008). The number average fiber length and the water retention value of the MFC fibers were reported to be 0.2 mm or less and 10 mL/g or more, respectively. The reinforcement ability of the MFC fibers, however, was not shown.

A method for the production of microfibrillated cellulose (MFC) using single-pass high consistency (>15%) refining/pretreatment, followed by multi-pass medium consistency (6-15%) or followed by multi-pass, medium consistency (6-15%) and then multi-pass low consistency (<6%) refining of cellulose fibers has been described (Sabourin, M. and Luukkonen, A. U.S. Pat. No. 8,906,198 B2, 2014). The average fiber length of the MFC produced was also reported to be 0.2 mm or less while the water retention value of the MFC was said to be 20 mL/g or more. The reinforcement ability of the MFC, however, was not shown. Furthermore, the energy applied in the high consistency refining/pretreatment is limited to 600 kWh/t or less in this method.

A method for the production of MFC using low to medium consistency (<12.5%) refining, followed by dewatering and then by medium to high consistency (12.5-20%) refining of pulp fibers has been reported (Heiskanen, I., et al. PCT WO 2014/106684 A1). Although one of the goals of using the reported method was to reduce the energy consumption in MFC production, no energy data for the reported method vs. those for the low to medium consistency refining or for the medium to high consistency refining were presented. It was suggested in this publication that a sequence of refining steps at a constant low consistency would require progressively increased energy, thus being ineffective, and that high consistency refining without a preliminary/preceding low consistency refining would similarly be energy consuming and ineffective.

SUMMARY

Prior to the present description, no multi-pass, high consistency refining with energy input of 600 to 20,000 kWh/t, followed by low consistency refining or by low consistency, non-refining mechanical treatment has been reported to produce cellulose filaments (CF), microfibrillated cellulose (MFC) or nanofibrillated cellulose (NFC). Furthermore, no mechanical method to reduce the energy requirement while in the meantime retain or improve the reinforcement ability of CF, MFC or NFC has been described. A method to produce CF with less energy and/or superior reinforcement ability is described herein.

In accordance with one aspect, there is provided a method for the production of cellulose filaments comprising: multi-pass, higher consistency refining, followed by low consistency refining or by low consistency, non-refining mechanical treatment of wood or other plant fibers.

In accordance with another aspect, there is provided a method of making cellulose filaments (CF) comprising: providing a high consistency cellulose pulp with a consistency of 20 to 65 wt % solids; a multi-pass high consistency refining of the high consistency cellulose pulp with a total specific refining energy (Energy$_{HC}$) of 2,000 to 18,000 kWh/t; to produce a refined cellulose material; diluting the refined cellulose material to a low consistency of 0.1 to 6 wt % solids to produce a low consistency cellulose material; and a low consistency refining of the low consistency cellulose material with a total specific refining energy (Energy$_{LC}$) of 15 to 2,000 kWh/t, wherein the method has a combined total specific refining energy (Energy$_C$) that is a sum of the total specific refining energy for the multi-pass high consistency refining plus the total specific refining energy for the low consistency refining (Energy$_{HC}$+Energy$_{LC}$).

In accordance with another aspect, there is provided the method described herein, wherein the total specific refining energy for the multi-pass, high consistency refining (Energy$_{HC}$) is 2,000 to 12,000 kWh/t.

In accordance with another aspect, there is provided the method described herein, wherein the total specific refining energy for the multi-pass, high consistency refining (Energy$_{HC}$) is 2,000 to 6,000 kWh/t.

In accordance with another aspect, there is provided the method described herein, wherein the consistency for the multi-pass, high consistency refining is 25 to 40 wt % solids.

In accordance with another aspect, there is provided the method described herein, wherein the consistency for the low consistency refining is 0.5 to 4 wt % solids.

In accordance with another aspect, there is provided the method described herein, wherein the total specific refining energy for the low consistency refining (Energy$_{LC}$) is 15 to 1,200 kWh/t.

In accordance with another aspect, there is provided the method described herein, wherein the total specific refining energy for the low consistency refining (Energy$_{LC}$) divided by the combined total specific refining energy (Energy$_C$) is an energy percentage of 0.08 to 50%.

In accordance with another aspect, there is provided the method described herein, wherein the energy percentage is 1 to 40%.

In accordance with another aspect, there is provided the method described herein, wherein the energy percentage is 2 to 30%.

In accordance with another aspect, there is provided the method described herein, wherein the energy percentage is 2 to 20%.

In accordance with another aspect, there is provided the method described herein, wherein the cellulose pulp is a softwood chemical pulp.

In accordance with another aspect, there is provided a method of making cellulose filaments (CF) comprising steps of: providing a high consistency cellulose pulp with a consistency of 20 to 65 wt % solids; a multi-pass high consistency refining of the high consistency cellulose pulp with a total specific refining energy (Energy$_{HC}$) of 2,000 to 18,000 kWh/t; to produce a refined cellulose material; diluting the refined cellulose material to a low consistency of 0.1 to 6 wt % solids to produce a low consistency cellulose material; and a mechanical treatment of the low consistency cellulose material with a non-refining apparatus at a specific mechanical energy (Energy$_{MT}$) less than 3,000 kWh/t.

In accordance with another aspect, there is provided the method described herein, wherein the cellulose pulp is a softwood chemical pulp.

In accordance with another aspect, there is provided the method described herein, wherein the mechanical treatment is performed in a non-refining apparatus for a period of 1 to 30 minutes.

In accordance with another aspect, there is provided a method described herein, wherein the non-refining apparatus is selected from the group consisting of a nanofilamenter, a pulper, a pulp mixing tank, an agitator, a re-circulation pump, and combinations thereof.

In accordance with another aspect, there is provided use of cellulose filaments (CF) produced by the method described herein as a reinforcement additive in the production of paper, tissue, paperboard, or composite.

In accordance with another aspect, there is provided use of cellulose filaments (CF) produced in the method described herein as a viscosity modifier in food products, coatings or drilling fluids.

In accordance with another aspect, there is provided use of cellulose filaments (CF) produced in the method described herein to form films for packaging and composite applications.

BRIEF DESCRIPTION OF THE DRAWINGS

Reference will now be made to the accompanying drawings, showing by way of illustration a particular embodiment described herein and in which.

DETAILED DESCRIPTION OF PARTICULAR EMBODIMENTS

Figure 1:
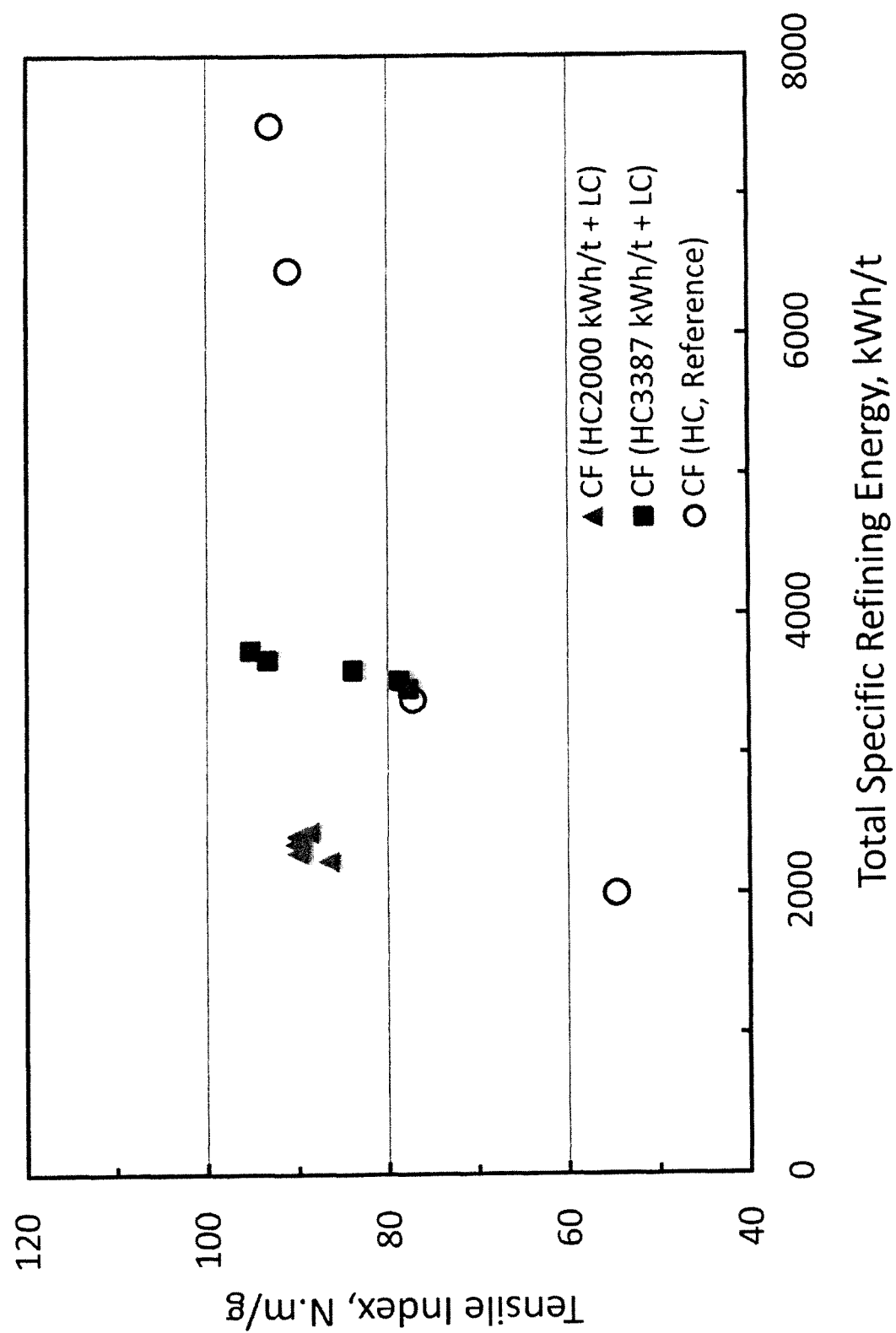
FIG. 1 is a plot of tensile index of CF films (20 g/m$^2$) vs. total specific refining energy needed to produce one set of CF using the reference, multi-pass, high consistency refining of an NBSK pulp, and to produce two sets of CF using the multi-pass, high consistency refining, followed by low consistency refining of the NBSK pulp, respectively.

For the production of cellulose filaments (CF) or fibrillated cellulose such microfibrillated cellulose (MFC) by mechanical treatment methods, energy constitutes a major cost. Reducing energy consumption for the said production while maintaining or further improving the reinforcement ability of CF or fibrillated cellulose such as MFC will allow the wider use of CF or fibrillated cellulose as a reinforcement additive in the production of paper, tissue, paperboard and composite products or as a viscosity or rheology modifier in products such as food, coating and drilling muds.

Pretreatments of wood or other plant fibers with chemical or enzyme has been reported to allow a significant reduction of energy consumption in the production of MFC (Siro, I and Plackett, D. Cellulose 17: 459-494, 2010). However, use of chemical or enzyme will reduce the yield of MFC and complicate the manufacturing process in terms of unit operation and effluent treatment. Although single-pass, high consistency refining with energy input <600 kWh/t, followed by multi-pass, medium consistency and/or multi-pass, low consistency refining of wood pulp fibers has been used to produce MFC. No energy reduction from the combination of single-pass, high consistency refining and the multi-pass, medium consistency and/or the multi-pass, low consistency refining over, for example, multi-pass, high consistency refining, has been reported. Although low to medium consistency (<12.5%) refining, followed by dewatering and then by medium to high consistency (12.5-20%) refining of pulp fibers has been claimed to produce MFC with one of the goals being to reduce energy consumption, no energy reduction data have been presented. In addition, no non-refining mechanical treatment has been used or reported to reduce the energy requirement in the production, or to improve the reinforcement ability, of CF or fibrillated cellulose such as MFC.

Unexpectedly, it has been discovered that multi-pass, high consistency refining of wood or other plant fibers with a certain total specific refining energy, followed by low-consistency refining, reduces significantly the total specific refining energy required for the production of cellulose filaments (CF) while retaining or improving the reinforcement ability of CF. It has also been discovered that there exists optimal percentage ranges of the total specific refining energy used for the low consistency refining (abbreviated as $Energy_{LC}$) over the total specific refining energy used for the multi-pass, high consistency refining (abbreviated as $Energy_{HC}$) and the total specific refining energy used for the low consistency refining ($Energy_{LC}$). Such optimal percentage ranges of "$Energy_{LC}/(Energy_{HC}+Energy_{LC})$" have been discovered to be dependent, among others, on the total specific refining energy used for the multi-pass, high consistency refining ($Energy_{HC}$). The sum of $Energy_{HC}+Energy_{LC}$ is also abbreviated as $Energy_C$ or referred to as combined total specific refining energy described herein.

Also unexpectedly, it has been discovered that multi-pass, high consistency refining of wood or other plant fibers with a certain total specific refining energy, followed by non-refining mechanical treatment, reduces the total specific refining energy required for the production of cellulose filaments (CF) while retaining or improving the reinforcement ability of CF.

The unexpected and significant reduction of the total specific refining energy required for the production of cellulose filaments (CF) while retaining or even improving the reinforcement ability of CF by multi-pass, high consistency refining of wood or other plant fibers, followed by low consistency refining or non-refining mechanical treatment might be due to the formation of a small portion of tangled or intertwisted CF during high consistency refining and the unexpected and superior ability of low consistency refining or non-refining mechanical treatment over high consistency refining to untangle the tangled or intertwisted CF. Untangling of the tangled or intertwisted CF will result in well separated cellulose filaments and thus increase the surface areas, the bonding and reinforcement ability of the CF produced.

According to one aspect, multi-pass, high consistency refining of wood or other plant fibers, followed by low-consistency refining or non-refining mechanical treatment, reduces the total specific refining energy for the production of cellulose filaments (CF) while maintaining or improving the reinforcement ability of CF.

According to another aspect, the total specific refining energy for the multi-pass, high consistency refining is preferably 2,000-18,000 kWh/t, and more preferably 2,000-12,000 kWh/t.

According to yet another aspect, the total specific refining energy for low consistency refining is preferably 15-2,000 kWh/t, and more preferably 15-1,200 kWh/t.

According to still yet another aspect, the percentage of the total specific refining energy for low consistency refining over the total specific refining energy for the said multi-pass, high consistency refining, followed by low consistency refining is preferably 0.08-50%, more preferably 1-40% and most preferably 2-30%.

According to still another aspect, the non-refining mechanical treatment is performed at a consistency of 0.1-6% for 1-30 minutes in an apparatus other than a refiner.

According to yet still another aspect, the non-refining mechanical treatment is performed at a consistency of 0.1-6% for 1-30 minutes in a cellulose nanofilameter as described in CA2799123 A1.

According to one more aspect, cellulose filaments (CF) described herein are used as an additive to reinforce cellulose fiber products such as paper, tissue and paperboard or to reinforce composites made with plastics, thermoset or other materials.

According to still one more aspect, cellulose filaments (CF) described herein are used as a viscosity or rheology modifier in products such as food, coatings or drilling muds.

According to yet still one more aspect, cellulose filaments (CF) described herein are used to form a dry, CF film on a papermachine for the storage and/or the transportation of the CF material.

The CF films can also be used as strong and recyclable films for the manufacturing of composites and for packaging or other applications.

The cellulose filaments (CF) produced according to the method described herein require less total specific refining energy than the CF, referred to as cellulose nanofilaments (CNF) described in WO2012/097446 A1, but possess the same reinforcement ability as that described in WO2012/097446 A1 or in a preferred embodiment, higher reinforcement ability than that described in WO2012/097446 A1. The CF produced according to the method described herein in a preferred embodiment has an aspect ratio at least 200, and diameters of approximately 30-500 nm. It is structurally very different from other fibrillated cellulose such as microfibrillated cellulose (MFC) prepared using other mechanical refining and/or disintegration methods.

The reinforcement ability or viscosity modifying ability of the CF produced according to the method described herein depends on, among others, the source of the wood or other plant fibers, the refiner type, size, configuration and operating conditions, and the number of passes and energy input for the multi-pass, high consistency refining. It also depends on the refiner type, size, configuration and operating conditions, and the energy input for the subsequent low consistency refining, or on the apparatus configuration and the operating conditions such as mixing speed and time of the subsequent, non-refining mechanical treatment.

The refiner described herein may be a refiner of any type, size and configuration, known for a person skilled in the art, suitable for the high consistency or low consistency refining of wood or other plant fibers. They include, but are not limited to, single disc refiner, double disc refiner, conical refiner, Conflo refiner. One single refiner or a series of refiners of any type, size and configuration can be used for the multi-pass, high consistency refining, and for the low consistency refining of wood or other plant fibers, respectively, to produce cellulose filaments (CF) described herein.

The non-refining mechanical treatment described herein may be conducted in any apparatus that is not a refiner, but is known for a person skilled in the art, suitable for mechanical treatment of the wood or other plant fibers.

The expression "non-refining mechanical treatment" is defined herein to describe any mechanical treatment in an apparatus that is not a refiner. In a preferred embodiment, the non-refining apparatus is a nanofilameter, a pulper, a pulp mixing tank, an agitator, a re-circulation pump, and combinations thereof.

Consistency is defined herein as the weight (wt) percentage of solids such as wood or other plant fibers, or cellulose filaments (CF) in a mixture of water and, the solids such as wood or other plant fibers, or cellulose filaments (CF).

High consistency is defined herein, as a consistency of 20-65 wt % solids, wherein a consistency of, for example, 30 wt % solids may also be abbreviated as a consistency of 30%.

Low consistency is defined herein, as a consistency of 0.1-6% wt % solids, wherein a consistency of, for example, 2 wt % solids may also be abbreviated as a consistency of 2%.

Percentage of total specific refining energy for the low consistency refining over total specific refining energy for the high consistency refining, followed by the low consistency refining is defined and calculated herein as [$Energy_{LC}$/($Energy_{HC}$+$Energy_{LC}$)]×100% wherein $Energy_{LC}$ is the total specific refining energy used for the low consistency refining and $Energy_{HC}$ is the total specific refining energy used for the high consistency refining.

Basis weight is defined herein, as the weight in grams (g) of the films of cellulose filaments (CF) or sheets of pulp fibers and CF per square meter ($m^2$) of the said films or sheets.

A weight that is oven-dried (od) basis described herein refers to the weight that excludes the weight of water. For a moist material such as CF, it is the water-free weight of the material that is calculated from its consistency.

The method of making cellulosic filaments (CF) described herein is illustrated by, but not limited to, the following examples.

General Procedure A: Cellulose filaments (CF) from multi-pass, high consistency refining of northern bleached softwood kraft (NBSK) pulp Unless otherwise specified, samples of CF from multi-pass, high consistency refining of an NBSK pulp was produced based on the method described in WO 2012/097446 A1 by refining the NBSK pulp at 30% consistency and a total specific refining energy of 800-12,000 kWh/t.

General Procedure B: CF from Multi-Pass, High Consistency Refining, Followed by Low Consistency Refining of NBSK Unless otherwise specified, samples of CF from multi-pass, high consistency refining of an NBSK pulp at a specific refining energy of 800-12,000 kWh/t were produced according to General Procedure A and were further refined in one single low consistency (LC) refiner or in a series of LC refiners with or without recirculation until the level of filaments development is reached. The number of refining passes and the total specific refining energy used to achieve a targeted property will depend on the total specific refining energy used for the initial development of CF at the high consistency refining stage, the refiner type (for example, conical or single or double disc refiner), the LC refiner fillings or plates (for example, material, pattern and wear,) and the refining conditions, such as consistency, the specific refining energy per pass and the refining intensity of the LC refiner.

General Procedure C: Lab Dispersion of CF

Unless otherwise specified, 24 g (od basis) of CF produced according to General Procedure A or B, was diluted to 1.2% consistency in a British Disintegrator with a known amount of deionized water (DI $H_2O$). The CF slurry was mixed at 3000 rpm for 15 minutes at temperature of 80° C.

General Procedure D: CF from Multi-Pass, High Consistency Refining, Followed by Low Consistency, Non-Refining Mechanical Treatment of NBSK Unless otherwise specified, samples of CF from multi-pass, high consistency refining of an NBSK pulp at a specific refining energy of 800-12,000 kWh/t were produced according to General Procedure A and were mechanically treated in a cellulose nanofilamenter as described in CA 2799123 A1 at 2% consistency for 2 to 30 minutes.

General Procedure E: Preparation of CF Films on a Standard Sheet Machine

A circular CF film with a size of 0.02 $m^2$ was prepared using a modified PAPTAC Test Method, Standard C.5 as follows. Unless otherwise specified, 0.4 g (od basis) of CF prepared according to General Procedure A or B and General Procedure C, or according to General Procedure A and General Procedure D, was diluted with DI $H_2O$ to give a CF slurry at a consistency of 0.05%. The dispersion was transferred into the Standard Sheet Machine using a Teflon spoon. The dispersion inside the Standard Sheet Machine was gently stirred back and forth across the deckle (i.e. a removable metal frame) using a Teflon stick and was then allowed to become still. The drain valve of the Standard Sheet Machine was then released to allow the draining of water and closed when the water had drained out from the deckle and a CF film had been formed on top of the steel mesh.

The deckle was opened and one Whatman #1 filter paper (185 mm in diameter) was placed on top of the wet CF film. Two blotters were placed on top of the filter paper and couching was applied using a couch plate and a couch roll. 15 traverses backwards and forwards were applied before the couch plate and the two blotters were carefully removed. The filter paper with the CF film stuck to it was then slowly peeled off from the steel mesh.

A mirror-polished stainless steel disc was placed against the side of CF film. Pressing of the CF film was then performed according to the pressing procedure described in PAPTAC Test Method, Standard C.5 with the first and secondary pressing for 5 and 2 minutes, respectively.

After the pressing, the CF film which was sandwiched between the filter paper and the stainless steel plate was put into drying rings and dried in a constant temperature and humidity (23° C. and 50% relative humidity) room overnight. The film, with a basis weight of approximately 20 g/$m^2$ of CF, together with the filter paper, was then peeled off from the steel plate. The film and the filter paper were separated by peeling off the filter paper from the film while maintaining the film as flat as possible. Tensile index and tensile energy absorption (TEA) index of the film were determined according to PAPTAC Test Method, Standard D.34.

General Procedure F: Preparation of Handsheets from a Mixture of Hardwood Kraft Pulp and a CF Product Unless otherwise specified, a fully-bleached hardwood kraft (HWK) pulp in a dry-lap form was first combined with DI $H_2O$ and repulped/disintegrated in a helical pulper at 8% consistency, 400 rpm and 23° C. for 2 minutes. The repulped HWK pulp was then combined with a sample of CF dispersion prepared according to General Procedure A (or B) and General Procedure C, or according to General Procedure A and General Procedure D, at a weight (od basis) ratio of 90/10 or 95/5 (HWK pulp/CF) and with DI $H_2O$ to yield a slurry of pulp and CF mixture with a consistency of 0.33%. Handsheets (60 g/$m^2$) were prepared according to PAPTAC Test Method, Standard C.4. Tensile index and tensile energy absorption (TEA) index of the sheets were determined according to PAPTAC Test Method, Standard D.34. In a separate experiment, handsheets (60 g/$m^2$) from 100% of the HWK pulp were also prepared and their tensile index and TEA index measured.

Example 1

One set of cellulose filaments (CF) was produced from a NBSK pulp by multi-pass, high consistency (30%) refining with a total specific refining energy of 2000, 3387, 6458 and 7500 (kWh/t), respectively, according to General Procedure A. Samples of the CF were dispersed in the lab according to General Procedure C. The CF is referred to as CF (HC, Reference).

One set of CF was produced from the NBSK pulp by multi-pass, high consistency (30%) refining with a total specific refining energy of 2000 kWh/t according to General Procedure A, followed by low consistency (3.2-3.6%) refining in a low consistency Conflo refiner with a total specific refining energy of 232-435 kWh/t according to General Procedure B. Samples of the CF were dispersed in the lab according to General Procedure C. The CF is referred to as CF (HC2000 kWh/t+LC).

One set of CF was produced from the NBSK pulp by multi-pass, high consistency (30%) refining with a total specific refining energy of 3387 kWh/t according to General Procedure A, followed by low consistency (2.5-3.1%) refining in a low consistency Conflo refiner with a total specific refining energy of 80-357 kWh/t according to General Procedure B. Samples of the CF were dispersed in the lab according to General Procedure C. The CF is referred to as CF (HC3387 kWh/t+LC).

Figure 2:
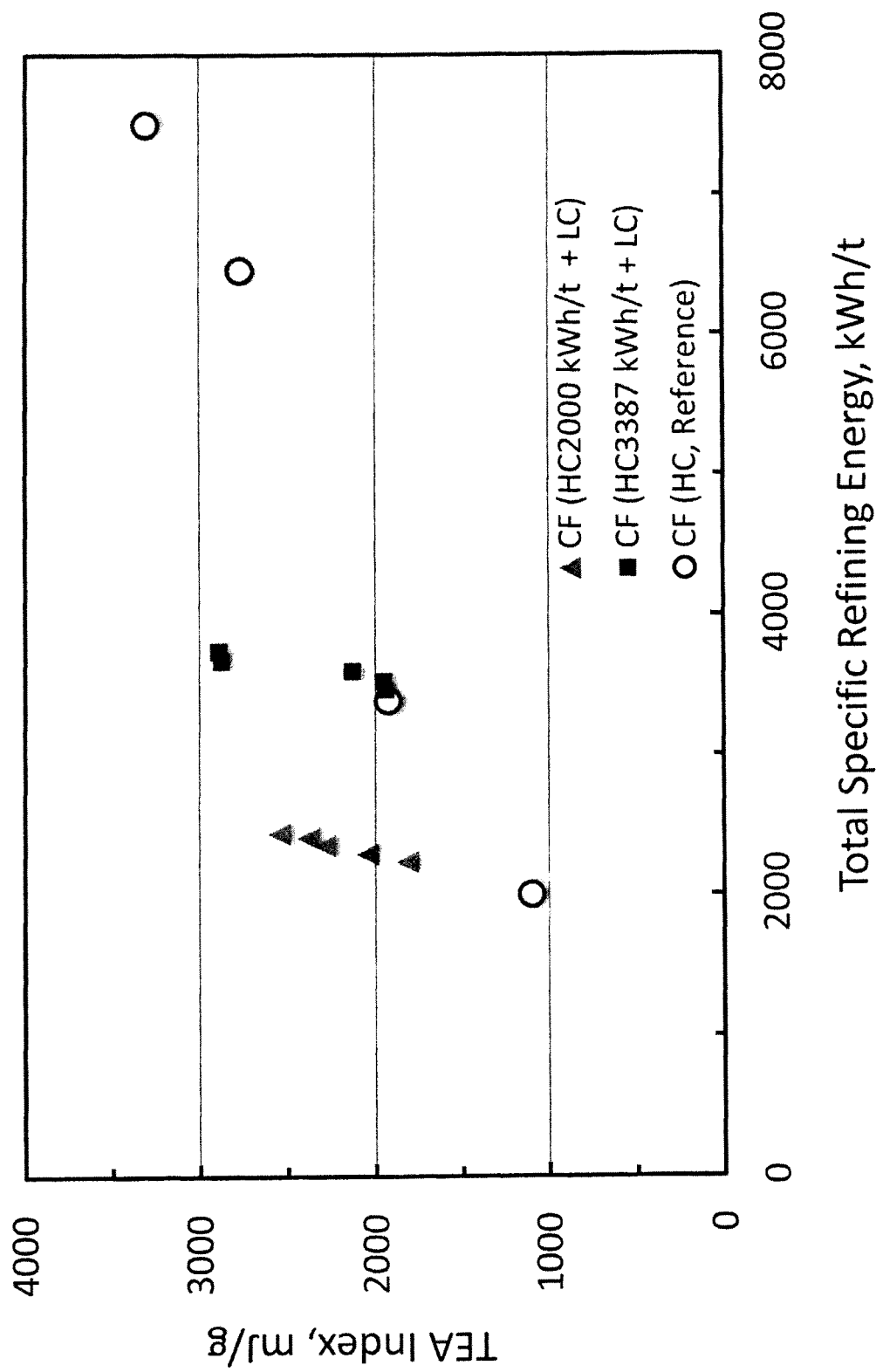
FIG. 2 is a plot of tensile energy absorption (TEA) index of CF films (20 g/m$^2$) vs. total specific refining energy needed to produce one set of CF using the reference, multi-pass, high consistency refining of an NBSK pulp, and to produce two sets of CF using the multi-pass, high consistency refining, followed by low consistency refining of the NBSK pulp, respectively.

CF films (20 g/m$^2$) from CF (HC, Reference), CF (HC2000 kWh/t+LC) and CF (HC3387 kWh/t+LC) were, respectively, prepared and the tensile index and TEA index of the films were measured according to General Procedure E. Table 1 lists the total specific refining energy applied for the production of CF using the multi-pass, high consistency (HC) refining and using the multi-pass, HC refining, followed by the low consistency (LC) refining of NBSK, respectively, the percentage of total specific refining energy for the LC refining (Energy$_{LC}$) over that for the "HC+LC" refining (Energy$_{HC}$+Energy$_{LC}$), the tensile index and TEA index of the CF films (20 g/m$^2$), and the percentage increase of the tensile index and change of the TEA index using the "HC+LC" refining over those using just the HC refining. The data show that multi-pass, HC refining, when stopped, for example, at a total specific refining energy of 2000 or 3387 kWh/t, and followed by LC refining with Energy$_{LC}$/(Energy$_{HC}$+Energy$_{LC}$) being >5.9%, significantly reduce the total specific refining energy while retaining or improving the tensile or TEA index of the CF films. For example, the tensile index of the film of CF produced using multi-pass, high consistency refining, followed by low consistency refining at a total specific refining energy of 2289 kWh/t is 90.06 N·m/g, compared to a tensile index of 77.22 N·m/g for the film of CF produced using just multi-pass, high consistency refining at a total specific refining energy of 3387 kWh/t. Of the 2289 kWh/t total specific refining energy for the said multi-pass, high consistency refining, followed by low consistency refining, 2000 kWh/t total specific refining energy was for the multi-pass, high consistency refining and 289 kWh/t total specific refining energy was for the low consistency refining. FIGS. 1 and 2 are plots of the tensile index and TEA index, respectively, of the CF films (20 g/m$^2$) vs. the total specific refining energy needed to produce one set of CF using the reference, multi-pass, high consistency refining of the NBSK pulp, and to produce two sets of CF using the multi-pass, high consistency refining, followed by the low consistency refining of the NBSK pulp.

TABLE 1

Total specific refining energy for the production of CF using the multi-pass, high consistency (HC) refining and using the multi-pass, HC refining, followed by the low consistency (LC) refining of NBSK, respectively, the percentage of total specific refining energy for the LC refining (Energy$_{LC}$) over that for the "HC + LC" refining (Energy$_{HC}$ + Energy$_{LC}$), the tensile index and TEA index of the CF films (20 g/m$^2$), and the percentage increase of the tensile index and change of TEA index using the "HC + LC" refining over those using just the HC refining.

| CF | Energy$_{HC}$ (kWh/t) | Energy$_{LC}$ (kWh/t) | Energy$_{LC}$/ (Energy$_{HC}$ + Energy$_{LC}$) (%) | Tensile Index (N · m/g) | Increase of tensile index by "HC + LC" refining over HC refining (%) | TEA index (mJ/g) | Change of TEA index by "HC + LC" refining over HC refining (%) |
|---|---|---|---|---|---|---|---|
| CF (HC, Reference) | 2000 | | | 54.68 | | 1103 | |
| CF (HC, Reference) | 3387 | | | 77.22 | | 1928 | |
| CF (HC, Reference) | 6458 | | | 91.01 | | 2770 | |
| CF (HC, Reference) | 7500 | | | 93.02 | | 3311 | |
| CF (HC2000 kWh/t + LC) | 2000 | 232 | 10.4 | 86.64 | 58.5 | 1818 | 64.8 |
| CF (HC2000 kWh/t + LC) | 2000 | 289 | 12.6 | 90.06 | 64.7 | 2045 | 85.4 |
| CF (HC2000 kWh/t + LC) | 2000 | 353 | 15.0 | 90.38 | 65.3 | 2291 | 107.7 |
| CF (HC2000 kWh/t + LC) | 2000 | 405 | 16.8 | 90.22 | 65.0 | 2382 | 116.0 |
| CF (HC2000 kWh/t + LC) | 2000 | 435 | 17.9 | 88.93 | 62.6 | 2545 | 130.7 |
| CF (HC3387 kWh/t + LC) | 3387 | 80 | 2.3 | 77.76 | 0.7 | 1678 | −13.0 |
| CF (HC3387 kWh/t + LC) | 3387 | 140 | 4.0 | 78.74 | 2.0 | 1692 | −12.2 |
| CF (HC3387 kWh/t + LC) | 3387 | 214 | 5.9 | 83.91 | 6.8 | 2131 | 10.5 |
| CF (HC3387 kWh/t + LC) | 3387 | 289 | 7.9 | 93.40 | 16.2 | 2879 | 49.3 |

TABLE 1-continued

Total specific refining energy for the production of CF using the multi-pass, high consistency (HC) refining and using the multi-pass, HC refining, followed by the low consistency (LC) refining of NBSK, respectively, the percentage of total specific refining energy for the LC refining ($Energy_{LC}$) over that for the "HC + LC" refining ($Energy_{HC}$ + $Energy_{LC}$), the tensile index and TEA index of the CF films (20 g/m²), and the percentage increase of the tensile index and change of TEA index using the "HC + LC" refining over those using just the HC refining.

| CF | $Energy_{HC}$ (kWh/t) | $Energy_{LC}$ (kWh/t) | $Energy_{LC}$/($Energy_{HC}$ + $Energy_{LC}$) (%) | Tensile Index (N·m/g) | Increase of tensile index by "HC + LC" refining over HC refining (%) | TEA index (mJ/g) | Change of TEA index by "HC + LC" refining over HC refining (%) |
|---|---|---|---|---|---|---|---|
| CF (HC3387 kWh/t + LC) | 3387 | 357 | 9.5 | 95.30 | 23.4 | 2895 | 50.1 |

Example 2

Handsheets (60 g/m²) from a bleached hardwood kraft (HWK) pulp and the CF (HC, Reference) from Example 1 at 90/10 weight (od basis) ratio of HWK/CF were prepared, and the tensile index and TEA index of the handsheets were measured according to General Procedure F.

Handsheets (60 g/m²) from the same HWK and the CF (HC2000 kWh/t+LC) from Example 1 at 90/10 weight (od basis) ratio of HWK/CF were also prepared, and the tensile index and TEA index of the handsheets were measured according to General Procedure F.

Handsheets (60 g/m²) from the same HWK and the CF (HC3387 kWh/t+LC) from Example 1 at 90/10 weight (od basis) ratio of HWK/CF were also prepared, and the tensile index and TEA index of the handsheets were measured according to General Procedure F.

In a separate experiment, handsheets (60 g/m²) from 100% HWK (without any CF) were also prepared, and the tensile index and TEA index of the handsheets were measured according to General Procedure F.

Figure 3:
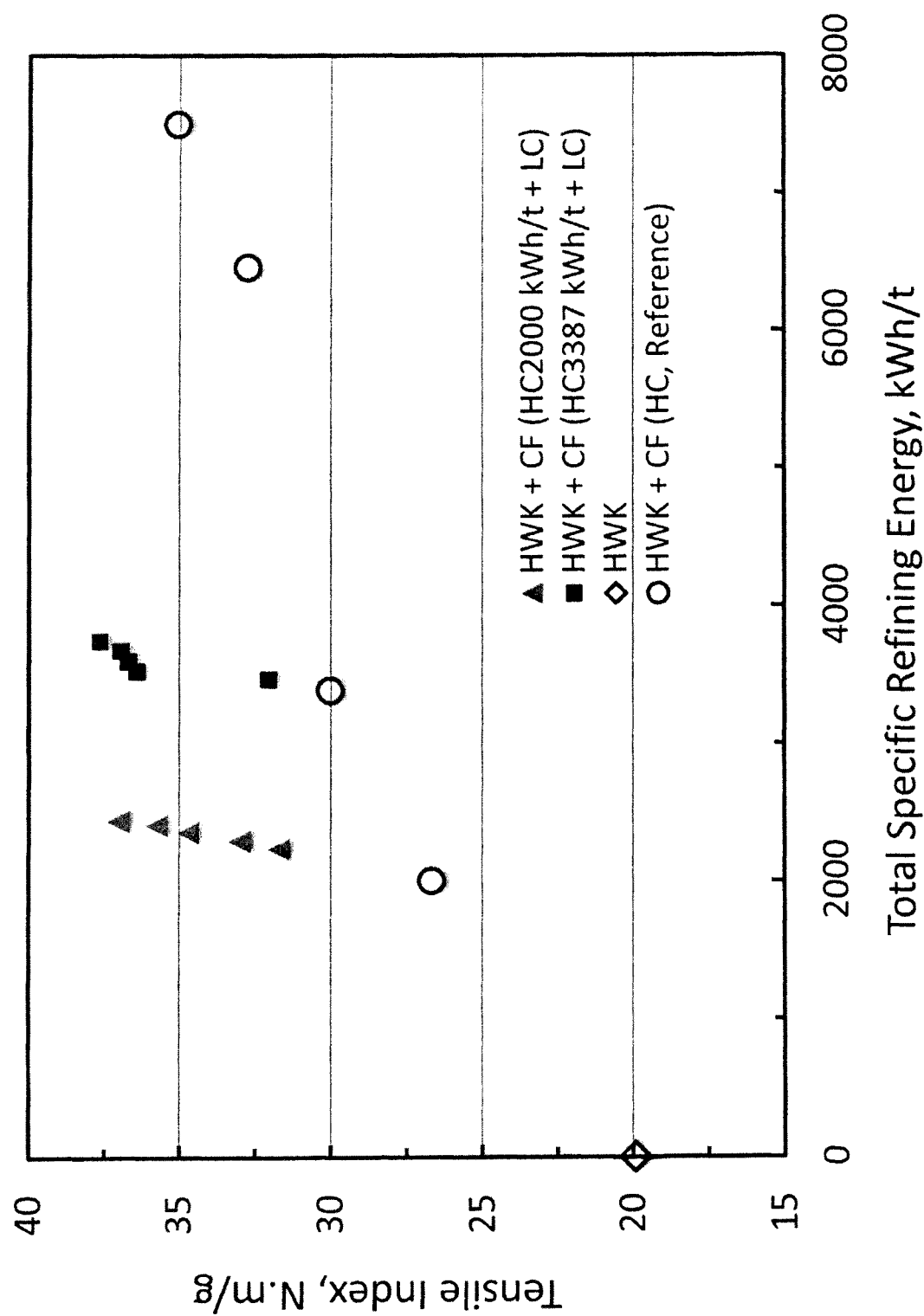
FIG. 3 is a plot of tensile index of handsheets (60 g/m$^2$) prepared from 90 wt % of an HWK pulp and 10 wt % CF vs. total specific refining energy needed to produce one set of CF using the reference, multi-pass, high consistency refining of an NBSK pulp, and to produce one set of CF using the multi-pass, high consistency refining, followed by low consistency refining of the NBSK pulp, respectively.
Figure 4:
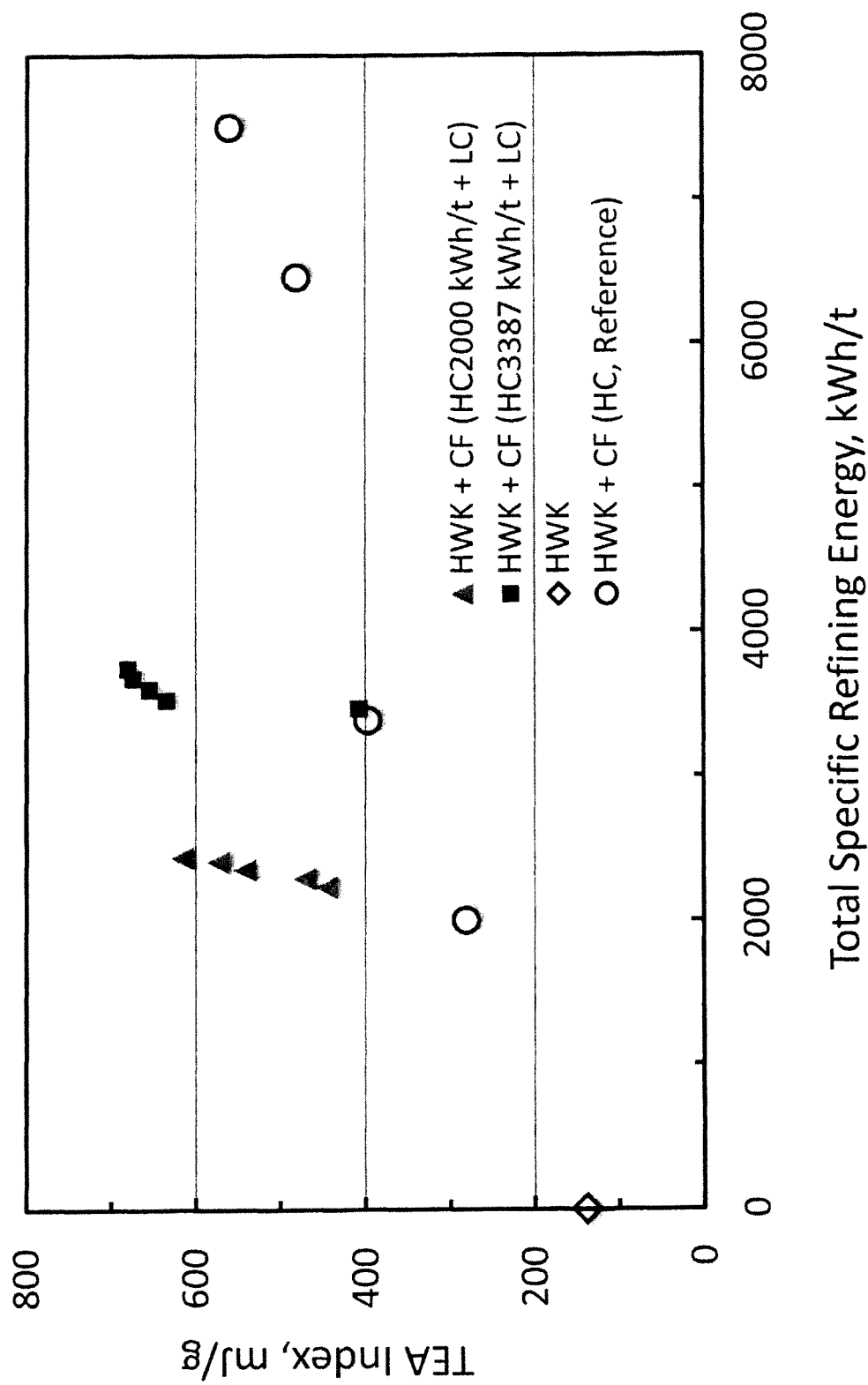
FIG. 4 is a plot of tensile energy absorption (TEA) index of handsheets (60 g/m$^2$) prepared from 90 wt % of an HWK pulp and 10 wt % CF vs. total specific refining energy needed to produce one set of CF using the reference, multi-pass, high consistency refining of an NBSK pulp, and to produce one set of CF using the multi-pass, high consistency refining, followed by low consistency refining of the NBSK pulp, respectively.

Table 2 lists the total specific refining energy needed for the production of CF using the multi-pass, high consistency (HC) refining and using the multi-pass, HC refining, followed by the low consistency (LC) refining of NBSK, respectively, the percentage of total specific refining energy for the LC refining ($Energy_{LC}$) over that for the "HC+LC" refining ($Energy_{HC}$+$Energy_{LC}$), the tensile index and TEA index of the handsheets (60 g/m²) made from the HWK and CF, and the percentage increase of the tensile index and change of the TEA index using the "HC+LC" refining over those using just the HC refining. The data show that multi-pass, HC refining, when stopped, for example, at a total specific refining energy of 2000 or 3387 kWh/t, and followed by LC refining with $Energy_{LC}$/($Energy_{HC}$+$Energy_{LC}$) being in a range of 2-18% or preferably in a range of 4-18%, significantly reduce the total specific refining energy while improving the reinforcement ability of the CF for the HWK pulp at CF/HWK weight ratio of 10/90. The tensile index and TEA index of the handsheets made from 100% HWK pulp (without any CF) were 19.9 N·m/g and 163 mJ/g, respectively. Addition to the HWK pulp furnish of 10% CF produced, for example, using multi-pass, high consistency refining at a total specific refining energy of 3387 kWh/t increased the tensile index and the TEA index of the handsheets to 30.04 N·m/g and 398 mJ/g, respectively. Remarkably, addition to the same HWK pulp furnish of 10% CF produced using multi-pass, high consistency refining, followed by low consistency refining, at a total specific refining energy ($Energy_{HC}$+$Energy_{LC}$) of, for example, only 2289 kWh/t increased the tensile index and the TEA index of the handsheets to 33.01 N·m/g and 471 mJ/g, respectively. FIGS. 3 and 4 are plots of the tensile index and TEA index, respectively, of the handsheets (60 g/m²) from the HWK pulp and CF vs. total specific refining energy needed to produce one set of CF using the reference, multi-pass, high consistency refining of an NBSK pulp, and to produce one set of CF using the multi-pass, high consistency refining, followed by low consistency refining of the NBSK pulp.

TABLE 2

Total specific refining energy for the production of CF using the multi-pass, high consistency (HC) refining and using the multi-pass, HC refining, followed by the low consistency (LC) refining of NBSK, respectively, the percentage of total specific refining energy for the LC refining ($Energy_{LC}$) over that for the "HC + LC" refining ($Energy_{HC}$ + $Energy_{LC}$), the tensile index and TEA index of handsheets (60 g/m²) made from the CF and the HWK pulp, and the percentage increase of the tensile index and change of TEA index using the "HC + LC" refining over those using just the HC refining.

| CF | $Energy_{HC}$ (kWh/t) | $Energy_{LC}$ (kWh/t) | $Energy_{LC}$/($Energy_{HC}$ + $Energy_{LC}$) (%) | Tensile Index (N·m/g) | Increase of tensile index by "HC + LC" refining over HC refining (%) | TEA index (mJ/g) | Change of TEA index by "HC + LC" refining over HC refining (%) |
|---|---|---|---|---|---|---|---|
| CF (HC, Reference) | 2000 | | | 26.69 | | 282 | |
| CF (HC, Reference) | 3387 | | | 30.04 | | 398 | |

TABLE 2-continued

Total specific refining energy for the production of CF using the multi-pass, high consistency (HC) refining and using the multi-pass, HC refining, followed by the low consistency (LC) refining of NBSK, respectively, the percentage of total specific refining energy for the LC refining ($Energy_{LC}$) over that for the "HC + LC" refining ($Energy_{HC} + Energy_{LC}$), the tensile index and TEA index of handsheets (60 g/m$^2$) made from the CF and the HWK pulp, and the percentage increase of the tensile index and change of the TEA index using the "HC + LC" refining over those using just the HC refining.

| CF | $Energy_{HC}$ (kWh/t) | $Energy_{LC}$ (kWh/t) | $Energy_{LC}/$ ($Energy_{HC}$ + $Energy_{LC}$) (%) | Tensile Index (N · m/g) | Increase of tensile index by "HC + LC" refining over HC refining (%) | TEA index (mJ/g) | Change of TEA index by "HC + LC" refining over HC refining (%) |
|---|---|---|---|---|---|---|---|
| CF (HC, Reference) | 6458 | | | 32.77 | | 482 | |
| CF (HC, Reference) | 7500 | | | 35.09 | | 561 | |
| CF (HC2000 kWh/t + LC) | 2000 | 232 | 10.4 | 31.73 | 15.9 | 446 | 58.2 |
| CF (HC2000 kWh/t + LC) | 2000 | 289 | 12.6 | 33.01 | 23.7 | 471 | 67.0 |
| CF (HC2000 kWh/t + LC) | 2000 | 353 | 15.0 | 34.70 | 30.0 | 542 | 92.2 |
| CF (HC2000 kWh/t + LC) | 2000 | 405 | 16.8 | 35.75 | 33.9 | 573 | 103.2 |
| CF (HC2000 kWh/t + LC) | 2000 | 435 | 17.9 | 37.02 | 38.7 | 616 | 118.4 |
| CF (HC3387 kWh/t + LC) | 3387 | 80 | 2.3 | 32.06 | 6.7 | 408 | 2.5 |
| CF (HC3387 kWh/t + LC) | 3387 | 140 | 4.0 | 36.43 | 21.3 | 635 | 59.4 |
| CF (HC3387 kWh/t + LC) | 3387 | 214 | 5.9 | 36.72 | 22.2 | 655 | 64.6 |
| CF (HC3387 kWh/t + LC) | 3387 | 289 | 7.9 | 36.96 | 23.0 | 674 | 69.3 |
| CF (HC3387 kWh/t + LC) | 3387 | 357 | 9.5 | 37.65 | 25.3 | 681 | 71.1 |

The tensile index and TEA index of the handsheets made from 100% HWK pulp (without any CF) were 19.9 N · m/g and 163 mJ/g, respectively.

Example 3

CF was produced from an NBSK pulp by multi-pass, high consistency (30%) refining with a total specific refining energy of 8298 kWh/t according to General Procedure A. A sample of the CF was dispersed in the lab according to General Procedure C and CF films (20 g/m$^2$) were then prepared and their TEA index were measured according to General Procedure E.

Samples of the CF produced from the NBSK pulp by multi-pass, high consistency (30%) refining with a total specific refining energy of 8298 kWh/h according to General Procedure A, were subjected to low consistency, non-refining mechanical treatment at a consistency of 2% for various times (2 to 30 minutes) according to General Procedure D. CF films (20 g/m$^2$) were then prepared and their TEA index were measured according to General Procedure E Table 3 lists the TEA index of the films of CF produced using the multi-pass, high consistency refining of the NBSK pulp, and using the multi-pass high consistency refining of the NBSK pulp, followed by the low consistency, non-refining mechanical treatment for various times, respectively. The data show that the TEA index of the CF films are significantly higher for CF produced using the multi-pass high consistency refining, followed by the low consistency, non-refining mechanical treatment than for CF produced using just the multi-pass high consistency refining. For example, the TEA index of the film of CF produced using the said multi-pass, high consistency refining, followed by the said low consistency, non-refining mechanical treatment for 5 minutes was 3075 mJ/g, about 15% higher than the 2666 mJ/g for the CF produced using just the said multi-pass, high consistency refining.

TABLE 3

TEA index of the CF films (20 g/m$^2$) from CF produced using multi-pass, high consistency refining of an NBSK pulp, and from CF produced using multi-pass, high consistency refining of an NBSK pulp, followed by low-consistency, non-refining mechanical treatment, respectively.

| Total specific refining energy (kWh/t) for multi-pass, high consistency refining | Low consistency, non-refining mechanical treatment time, min | TEA Index, mJ/g |
|---|---|---|
| 8298 | 0 | 2666 |
| 8298 | 2 | 2597 |
| 8298 | 5 | 3075 |
| 8298 | 15 | 4059 |
| 8298 | 30 | 4792 |

Example 4

Handsheets (60 g/m$^2$) from a bleached hardwood kraft (HWK) pulp and samples of the CF from Example 3 at 95/5 weight (od basis) ratio of HWK/CF were, respectively, prepared, and the TEA index of the handsheets were measured according to General Procedure F.

Table 4 lists the TEA index of the handsheets made from the HWK pulp and the CF produced using the multi-pass, high consistency refining of the NBSK pulp, and using the multi-pass, high consistency refining of the NBSK pulp, followed by the low consistency, non-refining mechanical treatment for various times, respectively. The data show that the TEA index of the handsheets reinforced with the CF produced using the multi-pass, high consistency refining, followed by the low consistency, non-refining mechanical treatment are much higher than that of the handsheets reinforced with the CF produced using just the multi-pass, high consistency refining. For example, the TEA index of the handsheets reinforced with the CF produced using the said multi-pass, high consistency refining, followed by the said low consistency, non-refining mechanical treatment for 15 minutes was 474 mJ/g, 50% higher than the 316 mJ/g for the handsheet reinforced with the CF produced using just the said multi-pass, high consistency refining.

TABLE 4

TEA index of the handsheets (60 g/m$^2$) made from a HWK pulp and CF produced using multi-pass, high consistency refining of an NBSK pulp, and CF produced using multi-pass, high consistency refining of an NBSK pulp, followed by low-consistency, non-refining mechanical treatment, respectively.

| Total specific refining energy (kWh/t) for multi-pass, high consistency refining | Low consistency, non-refining mechanical treatment time, min | TEA Index, mJ/g |
|---|---|---|
| 8298 | 0 | 316 |
| 8298 | 2 | 388 |
| 8298 | 5 | 405 |
| 8298 | 15 | 474 |
| 8298 | 30 | 519 |

Example 5

CF was produced from an NBSK pulp by multi-pass, high consistency (30%) refining with a total specific refining energy of 8150 kWh/t according to General Procedure A. A sample of the CF was dispersed in the lab according to General Procedure C. The CF is referred to as CF (HC 8150 kWh/t).

The CF produced from the NBSK pulp by multi-pass, high consistency (30%) refining with a total specific refining energy of 8150 kWh/t according to General Procedure A, was subjected to low consistency (3%) refining in a conical refiner with a total specific refining energy varying from 40 to 200 kWh/t according to General Procedure B. This series of CF is referred to as CF (HC8150 kWh/t+LC).

Handsheets (60 g/m$^2$) from the above-cited CF and a bleached hardwood kraft (HWK) pulp mixed at 95/5 weight (od basis) ratio of HWK/CF were prepared, and the tensile index and TEA index of the handsheets were measured according to General Procedure F.

Table 5 lists the total specific refining energy needed for the production of CF using the multi-pass, high consistency (HC) refining and using the multi-pass, HC refining, followed by the low consistency (LC) refining of NBSK, respectively, the percentage of total specific refining energy for the LC refining (Energy$_{LC}$) over that for the "HC+LC" refining (Energy$_{HC}$+Energy$_{LC}$), the tensile index and TEA index of the handsheets (60 g/m$^2$) made from the HWK and CF, and the percentage increase of the tensile index and change of the TEA index using the "HC+LC" refining over those using just the HC refining. The data show that the tensile and TEA index of the handsheets reinforced with the CF produced using the multi-pass, high consistency refining, followed by the low consistency LC refining with Energy$_{LC}$/(Energy$_{HC}$+Energy$_L$c) being in a range of 0.47-2.39% are significantly higher than those of the handsheets reinforced with the CF produced using just the multi-pass, high consistency refining. The tensile index and TEA index of the handsheets made from 100% HWK pulp (without any CF) were 19.8 N·m/g and 143 mJ/g, respectively. Addition to the HWK pulp furnish of 5% CF produced using high consistency refining only, at a total specific refining energy of 8150 kWh/t, increased the tensile index and the TEA index of the handsheets to 26.5 N·m/g and 330 mJ/g, respectively. Remarkably, addition to the same HWK pulp furnish of 5% CF produced using multi-pass, high consistency refining, followed by low consistency refining at a total specific refining energy (Energy$_{LC}$) of, for example, only 39 kWh/t increased the tensile index and the TEA index of the handsheets further to 27.7 N·m/g and 387 mJ/g, respectively. When the total specific refining energy used in the LC refining was 78 kWh/t and the Energy$_{LC}$/(Energy$_{HC}$+Energy$_{LC}$) was 0.95%, the tensile index and the TEA index of the handsheets were further improved to 28.2 N·m/g and 399 mJ/g, an increase of 6.7% and 20.8% respectively in the reinforcement ability of the CF, compared to those achieved by using CF made with high consistency refining only. According to data in Table 2, when CF was made with high consistency refining only, the refining energy had to be increased from 6458 to 7500 kWh/t, an increase of more than 1000 kWh/t, to obtain a similar level of improvement (10.6% increase in tensile index and 16.4% increase in TEA index) in the CF reinforcement ability to that achieved by multi-pass, high consistency refining, followed by low consistency refining using only 78 kWh/t for the low consistency refining as shown here in Example 5.

TABLE 5

Total specific refining energy for the production of CF using the multi-pass, high consistency (HC) refining, and using the multi-pass, HC refining, followed by the low consistency (LC) refining of NBSK, respectively, the percentage of total specific refining energy for the LC refining (Energy$_{LC}$) over that for the "HC + LC" refining (Energy$_{HC}$ + Energy$_{LC}$), the tensile index and TEA index of handsheets (60 g/m$^2$) made from the CF and the HWK pulp, and the percentage increase of the tensile index and change of the TEA index using the "HC + LC" refining over those using just the HC refining.

| Energy$_{HC}$ (kWh/t) | Energy$_{LC}$ (kWh/t) | Energy$_{LC}$/ (Energy$_{HC}$ + Energy$_{LC}$) (%) | Tensile Index (N · m/g) | Increase of tensile index by "HC + LC" refining over HC refining (%) | TEA index (mJ/g) | Change of TEA index by "HC + LC" refining over HC refining (%) |
|---|---|---|---|---|---|---|
| 8150 | | | 26.5 | | 330.3 | |
| 8150 | 38.6 | 0.47 | 27.7 | 4.5 | 386.6 | 17.0 |
| 8150 | 78.1 | 0.95 | 28.2 | 6.7 | 399.0 | 20.8 |
| 8150 | 118 | 1.42 | 28.3 | 6.9 | 419.0 | 26.8 |

TABLE 5-continued

Total specific refining energy for the production of CF using the multi-pass, high consistency
(HC) refining, and using the multi-pass, HC refining, followed by the low consistency (LC)
refining of NBSK, respectively, the percentage of total specific refining energy for the LC
refining (Energy$_{LC}$) over that for the "HC + LC" refining (Energy$_{HC}$ + Energy$_{LC}$), the
tensile index and TEA index of handsheets (60 g/m$^2$) made from the CF and the HWK
pulp, and the percentage increase of the tensile index and change of the TEA index
using the "HC + LC" refining over those using just the HC refining.

| Energy$_{HC}$ (kWh/t) | Energy$_{LC}$ (kWh/t) | Energy$_{LC}$/ (Energy$_{HC}$ + Energy$_{LC}$) (%) | Tensile Index (N · m/g) | Increase of tensile index by "HC + LC" refining over HC refining (%) | TEA index (mJ/g) | Change of TEA index by "HC + LC" refining over HC refining (%) |
|---|---|---|---|---|---|---|
| 8150 | 158 | 1.90 | 28.7 | 8.2 | 422.4 | 27.9 |
| 8150 | 199 | 2.39 | 29.7 | 12.0 | 431.6 | 30.7 |

The tensile index and TEA index of the handsheets made from 100% HWK pulp (without any CF) were 19.8 N · m/g and 143 mJ/g, respectively.

The invention claimed is:

1. A method of making cellulose filaments (CF) comprising:
    providing a high consistency cellulose pulp with a consistency of 20 to 65 wt % solids;
    a multi-pass high consistency refining of the high consistency cellulose pulp with a total specific refining energy (Energy$_{HC}$) of 2,000 to 18,000 kWh/t; to produce a refined cellulose material;
    diluting the refined cellulose material to a low consistency of 0.1 to 6 wt % solids to produce a low consistency cellulose material;
    a low consistency refining of the low consistency cellulose material with a total specific refining energy (Energy$_{LC}$) of 15 to 2,000 kWh/t; and
    recovering the cellulose filaments having an aspect ratio of at least 200 to 5000 and a width of 30 nm to 500 nm from the refiner,
    wherein the method has a combined total specific refining energy (Energy$_{HC}$) that is a sum of the total specific refining energy for the multi-pass high consistency refining plus the total specific refining energy for the low consistency refining (Energy$_{HC}$+Energy$_{LC}$).

2. The method of claim 1, wherein the total specific refining energy for the multi-pass, high consistency refining (Energy$_{Hc}$) is 2,000 to 12,000 kWh/t.

3. The method of claim 1, wherein the total specific refining energy for the multi-pass, high consistency refining (Energy$_{HC}$) is 2,000 to 6,000 kWh/t.

4. The method of claim 1, wherein the consistency for the multi-pass, high consistency refining is 25 to 40 wt % solids.

5. The method of claim 1, wherein the consistency for the low consistency refining is 0.5 to 4 wt % solids.

6. The method of claim 1, wherein the total specific refining energy for the low consistency refining (Energy$_{LC}$) is 15 to 1,200 kWh/t.

7. The method of claim 1, wherein the total specific refining energy for the low consistency refining (Energy$_{LC}$) divided by the combined total specific refining energy (Energy$_C$) is an energy percentage of 0.08 to 50%.

8. The method of claim 7, wherein the energy percentage is 1 to 40%.

9. The method of claim 7, wherein the energy percentage is 2 to 30%.

10. The method of claim 7, wherein the energy percentage is 2 to 20%.

11. The method of claim 1, wherein the cellulose pulp is a softwood chemical pulp.

12. The method of claim 1, wherein the refined cellulose material is diluted to a low consistency of 0.1 to 5 wt % solids.

13. The method of claim 1, wherein the CF tensile strength increased per Energy$_{LC}$ is greater than that per Energy$_{HC}$.

* * * * *